United States Patent [19]
Irvine et al.

[11] Patent Number: 6,013,016
[45] Date of Patent: *Jan. 11, 2000

[54] FLEXIBLE BORING MACHINE AND METHOD

[75] Inventors: Edward J. Irvine, St. Clair Shores; Michael D. Panetta, Royal Oak, both of Mich.

[73] Assignee: Unova IP Corp., Beverly Hills, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/837,650

[22] Filed: Apr. 23, 1997

[51] Int. Cl.$^7$ .................................................. B23Q 3/155
[52] U.S. Cl. ................................ 483/1; 408/1 R; 408/234
[58] Field of Search .................................. 483/1, 30, 36; 408/1 R, 31, 43, 48, 53, 37, 54, 50, 62, 91, 234, 708

[56] References Cited

U.S. PATENT DOCUMENTS

| | | |
|---|---|---|
| 4,004,332 | 1/1977 | Wawrzyniak ................................ 20/27 |
| 4,197,040 | 4/1980 | Wawrzyniak ............................ 408/26 |
| 4,451,186 | 5/1984 | Payne ........................................ 408/54 |
| 4,476,613 | 10/1984 | Wawrzyniak ............................. 29/27 |
| 4,482,043 | 11/1984 | Bauman et al. .......................... 29/33 P |
| 4,646,423 | 3/1987 | Schlesinger et al. .................... 29/33 P |
| 4,693,642 | 9/1987 | Mair et al. ................................ 408/59 |
| 4,712,953 | 12/1987 | Witzel et al. ............................ 409/131 |
| 4,715,490 | 12/1987 | Date et al. ................................. 29/33 P |
| 4,747,193 | 5/1988 | Hashidate et al. ....................... 29/33 P |
| 4,946,021 | 8/1990 | Murphy .................................... 29/33 P |
| 5,221,165 | 6/1993 | Goszczynski ............................ 408/1 R |
| 5,368,539 | 11/1994 | Mills et al. ................................. 483/1 |

*Primary Examiner*—Andrea L. Pitts
*Assistant Examiner*—Adesh Bhargava
*Attorney, Agent, or Firm*—Reising, Ethington, Barnes, Kisselle, Learman & McCulloch, P.C.

[57] ABSTRACT

An engine block is located and clamped on a pallet and then brought into a boring station where the pallet is located and clamped on a shuttle. The shuttle moves solely along a straight horizontal path to move the engine block into the work station, locate the engine block during a machining operation, and then transfer the block out of the work station. First and second three-axis boring machines at respective opposite sides of the block locate crankshaft and camshaft boring bars for different engine blocks and then simultaneously back bore both the crankshaft and camshaft bores. A computer numerical control (CNC) positions the boring bars and the block and controls other machining parameters for different engine blocks. The CNC causes the shuttle to move to a location horizontally offset from a final machining location so that the boring bar axes are offset horizontally from the bearing bore axes and the boring bars are then inserted into the block. The shuttle is then shifted horizontally to the final machining position for the back boring operation.

39 Claims, 4 Drawing Sheets

FLEXIBLE BORING MACHINE AND METHOD

FIELD OF THE INVENTION

This invention relates to back boring holes in a workpiece and more particularly to a flexible boring machine and boring method for boring crankshaft and camshaft bearing bores for different engines at the same work station.

BACKGROUND OF THE INVENTION

Cast aluminum and cast iron engine blocks typically have crankshaft bearing blocks spaced axially along the engine at locations for a front main bearing, a rear main bearing, and a plurality of intermediate main bearings. After preparatory machining operations on the block, for finish machining, bearing caps are installed on the bearing blocks so that the bearing blocks and bearing caps are machined in situ to provide a precision crankshaft bearing bore to a defined roundness and axial alignment. Because the bearing blocks are spaced apart, this configuration is sometimes referred to as a bearing ladder. Most engine blocks also typically have a series of camshaft bearing blocks spaced axially of the engine at locations for front and rear end bearings and one or more intermediate bearings, also sometimes referred to as a bearing ladder. Of course, for overhead camshaft engines, one or more camshaft bearing ladders are in the cylinder heads.

Crankshaft and camshaft bearing ladders may be machined by either reaming or boring. A line boring bar typically used for back boring has radially-projecting, generally axially-aligned cutting tools spaced axially along the bar at locations to simultaneously back bore respective bearing block bores. Due to the length of an engine block or a cylinder head, a relatively long boring bar is required, say a minimum of about 24 inches. The length of the boring bar and the severity of the machining forces typically require an outboard bushing to support the free or distal end of the boring bar during back boring. Generally inboard and/or intermediate support bushings are used to minimize tool chatter. Because the radius through the cutting tools exceeds the bore radius, the boring bar must be inserted through the bore with the boring bar axis offset from the bearing bore axis. After the cutting tools have cleared the bearing blocks, the boring bar axis can then be aligned coaxially with the bearing bore axis for the back boring operation.

Prior to the present invention, applicant's assignee has used single-axis boring machines wherein the spindle moves only on its rotational axis to insert and retract the boring bar. With the spindle retracted, a lift-and-carry transfer brings the engine block into the work station and locates the block in an initial setup position, with the bearing bore axis offset vertically from the boring bar axis to provide clearance in a vertical direction for the cutting tools. With the axes offset, the spindle can then be rapidly extended to insert the boring bar through the bearing bore. The block is then lowered or dropped onto precision locators and clamped in place in a final machining position with the boring bar axis coaxial with the bearing bore axis. Other arrangements such as a machining fixture with retractable setup plungers can also be used. After a relatively short back boring stroke of a few inches, the block is raised slightly by the transfer and/or setup plungers to provide a clearance offset between the bore and boring bar axes and the spindle is then rapidly retracted to withdraw the boring bar. Two opposed single-axis boring machines as well as two single-axis machines at the same side of the block have also been used so that camshaft and crankshaft bores can be machined at the same work station.

Similar prior art back boring stations are described in U.S. Pat. No. 5,221,165 granted Jun. 22, 1993 and U.S. Pat. No. 4,693,642 (Mair et al) granted Sep. 15, 1987. Such boring stations operate satisfactorily and are relatively cost efficient for long manufacturing runs of a single engine type, for example for a given V-8 engine. However, different engine types such as cast iron, cast aluminum, V-8, V-6, V-10, quad, etc., have different camshaft and crankshaft locations and typically require different tools and, in the case of a line boring bar, different clearance offsets to insert and retract the boring bars. Consequently, when production is switched to a different engine type, substantial down time is required to set up single-axis boring machines, e.g., precision setup for locating, clamping, transfer and the like. Alternatively, different stations must be used for different engines, substantially increasing the initial capital investment, not only for duplicating the stations but for additional conveyers, transfers and the like, and more floor space is required. With a single-axis boring machine and an in-line boring bar, this setup is aggravated by variations in the vertical location of the bores on the part; that is, the new part, such as an engine block, must be relocated relative to the boring bar axis, for both offset and coaxial alignment. This may even make it impractical to do both crankshaft and camshaft bores on more than one engine type without relocating and reclamping the part. Relocation and reclamping complicates precision locating of the camshaft bore to the crankshaft bore, increases machine cycle, set up and part transfer times.

The Goszczynski U.S. Pat. No. 5,221,165 and Mair et al U.S. Pat. No. 4,693,642 patents further delineate some of the drawbacks of the above described prior art boring method and apparatus and describe alternative boring methods and boring bars. Both alternatives use special boring bars with cutting tools on the distal end remote from the spindle, i.e., a single-point cutting tool or a multiple cutter assembly. In both alternatives the boring bars have special bearing structures or bearing pads which support the boring bar in the journals as the boring bar is advanced into the workpiece. This latter type of boring bar does have certain advantages over back boring using a line boring bar for certain applications, even though the tooling is special. However, back boring bars are still often used commercially for a variety of reasons, e.g., the boring bar is in tension and less likely to flex during machining and the back boring bar may be a conventional and simpler design.

The introduction of the "just-in-time" concept and "flexible" manufacturing systems in automobile manufacturing and the need for close and consistent tolerances, coupled with a continuing need to more effectively utilize engine lines to machine different engine types, presents a special need to eliminate disadvantages of the prior art boring stations.

SUMMARY OF THE INVENTION

In accordance with this invention, a workpiece having one or more bores and more particularly an engine casting, either an engine block or a cylinder head, is located and clamped on a pallet before it is brought into the boring station where the pallet is then located and clamped on a shuttle. Preferably, the shuttle moves solely along a horizontal path to move the workpiece into the work station, locate the workpiece, and transfer the workpiece out of the work station with the bore[s] positioned horizontally transverse to the shuttle path. One or more three-axis boring machines adjacent the shuttle path provide for universal movement of the boring bar[s] to locate the boring bar[s] relative to the bore[s] and perform the boring operation[s]. In the case of an engine block, opposite ends of the block face in opposite horizontal directions transverse to the shuttle path. First and second three-axis boring machines are disposed adjacent opposite ends of the block to locate camshaft and crankshaft boring bars at the crankshaft and camshaft bores when the block is in its final machining position. The three-axis boring machine[s] and the shuttle are controlled by a computer numerical control to accurately and precisely position the boring bar[s] for any given workpiece.

Preferably, fixed support bushings, located and dimensioned with precision, are used in combination with a floating adapter on the spindle to achieve close tolerances. With a floating adapter, both outboard and inboard support bushings are used with back boring bars and inboard support bushings are used with workpiece supported tools. For boring different workpieces in the same station, the bushing supports have multiple bushings arranged in a geometry corresponding to different bore locations on different workpieces.

For back boring using in-line boring bars, the shuttle moves to an offset position with one or more boring bar axes offset horizontally from one or more respective bearing bore axes and the boring bar[s] can then be inserted through the workpiece. The shuttle is shifted horizontally to a final machining position to align each boring bar axis with its corresponding bore so that the back boring operation can be performed.

Objects, features and advantages of this invention include a boring machine and boring method which provide cost-effective, reliable, rugged, simple, durable, dependable, flexible and precision boring of one or more bores in an engine block, cylinder head or other workpiece; flexible, cost-effective and precision boring of crankshaft and/or camshaft bores for one or more engine types and/or bores on other workpieces where the location of the bore[s] and/or other machining parameter varies for different workpieces; and flexible, cost-effective and precision back boring of both crankshaft and camshaft bores on different engine block types and/or two bores on other workpieces where the location of the bore[s] and/or other machining parameter varies for different blocks and/or other workpieces.

BRIEF DESCRIPTION OF THE DRAWINGS

These and other objects, features and advantages of the invention will become apparent from the following description of the invention and the best mode, the appended claims and the accompanying drawings in which:

DETAILED DESCRIPTION

Referring to the work station 20 shown in the drawings in greater detail, an engine block 22 is accurately located and rigidly clamped on a pallet 24 which in turn is accurately located and rigidly clamped on a shuttle 26 carried on ways 28 on a machine bed 30. Shuttle 26 is reciprocated in opposite horizontal directions by a shuttle drive 32 operatively connected with the shuttle by suitable means such as a precision lead screw (not shown) so that block 22, pallet 24 and shuttle 26 move only along a straight horizontal path designated by arrow 34. Block 22 and pallet 24 as positioned in FIG. 1 have been transferred from a conveyor 36 onto shuttle 26 via a transfer mechanism (not shown) which also transfers block 22 and pallet 24 from shuttle 26 to conveyor 36. Conveyor 36 is shown as carrying a second engine block 22' fastened on its pallet 24' waiting to be machined after of the back boring operations on block 22. Block 22' may have crankshaft and camshaft locations which are either the same as or different than block 22.

Figure 1:
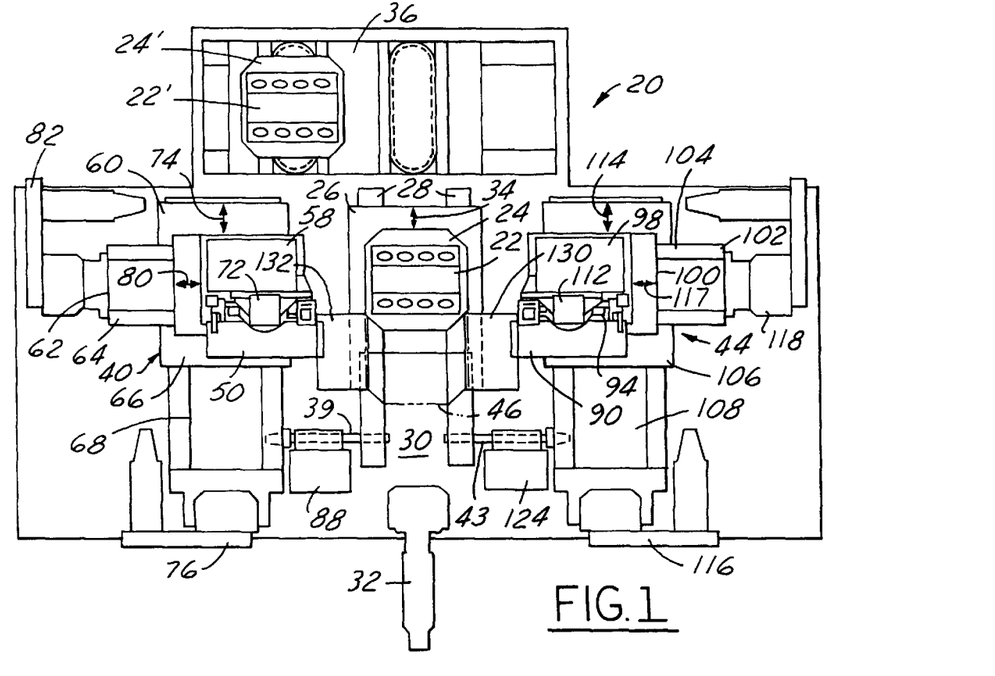
FIG. 1 is a semi-schematic top view of a machine work station for back boring crankshaft and camshaft bearing bores according to the present invention.
Figure 2:
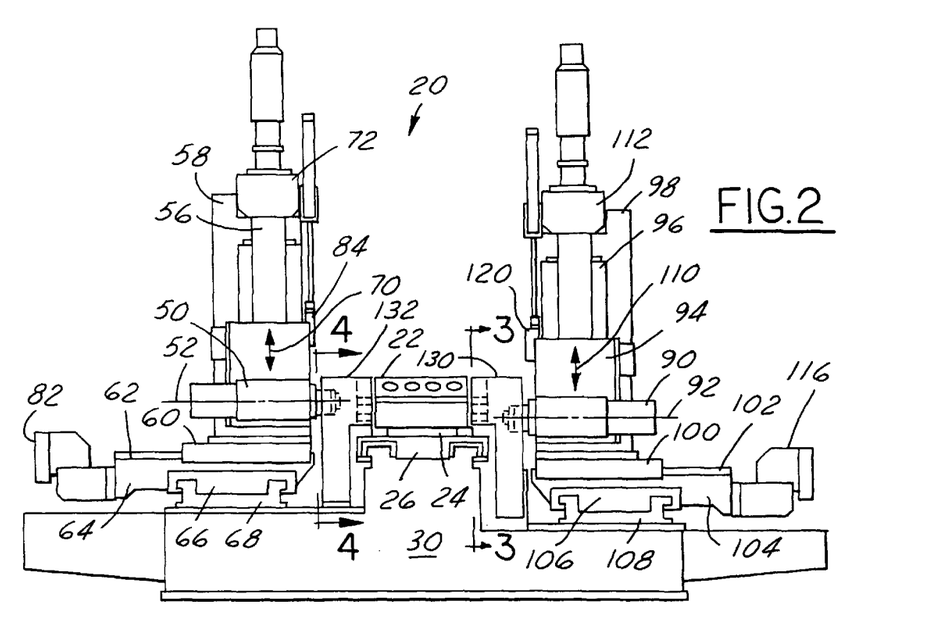
FIG. 2 is a semi-schematic front elevational view of the work station of FIG. 1.

As will later be described in greater detail, a camshaft bore 38 (FIGS. 5, 9A, 9B and 10A, 10B) in block 22 is back bored by a boring bar 39 on a first three-axis boring machine 40 located at one side of shuttle 26 (the left side is viewed in FIGS. 1 and 2). A crankshaft bore 42 (FIGS. 5, 9A, 9B and 10A, 10B) is also back bored by a second boring bar 43 on a three-axis boring machine 44 located at the other side of the shuttle (the right side as viewed in FIGS. 1 and 2). Block 22 is precisely located at its machining position shown in dashed lines in FIG. 1 and designated as 46. Shuttle 24 and boring machines 40, 44 are controlled by a programmable controller, digital computer with suitable software or computer numerical control, hereinafter called a "CNC" (not shown).

According to one important aspect of the present invention, shuttle 26 first locates block 22 horizontally offset from the final machining position 46 to provide a horizontal offset required to insert boring bars 39, 43. Shuttle 26 then jogs horizontally to the final machining position to coaxially align bores 38, 42 with boring bars 39, 43 for the back boring operation. This shuttle arrangement, in combination with the three-axis boring machines 40, 44, provides flexible yet precise locating to accommodate part variations, and the camshaft bore 38 and crankshaft bore 42 can both be back bored without moving block 22. Blocks with different crankshaft and camshaft bore locations can be back bored effectively and efficiently in the same production line with minimum machine cycle time and without any manual setup.

Referring to boring machine 40 in greater detail, a spindle 50 having a rotational axis 52 is mounted on a vertical slide 54 carried on a way 56 on a vertical pedestal 58. Pedestal 58 is rigidly mounted on a transverse horizontal slide 60 on a way 62 on a platen 64 which in turn is mounted on a horizontal slide 66 on a way 68 on bed 30. Slide 54 is moved in opposite vertical directions indicated by arrow 70, by a precision drive 72 carried on pedestal 58. Similarly, slide 66 is moved in opposite horizontal directions, indicated by arrow 74, by a precision drive 76 on bed 30. Consequently, slides 54 and 66 and drives 72 and 76 precisely locate spindle 50 relative to block 22 when block 22 is at its machining position 46. Boring bar 39 is inserted through and retracted from camshaft bore 38 by a precision drive 82 which reciprocates slide 60 in opposite directions indicated by arrow 80 transverse to shuttle path 34.

Boring machine 40 also has an automatic tool changer illustrated schematically at 84 for selecting the camshaft boring bar 39 from a tool magazine 88. Magazine 88 also stores other tools and tool changer 84 selects other tools (not shown), such as a different boring bar for block 22' if it has a camshaft bore diameter different from block 22. Other types of tools such as reaming tools and workpiece supported boring tools can also be stored in magazine 88 and selected by tool changer 84 for different machining operations. Other machining capabilities at station 20 provide additional flexibility and important advantages, as will later be described. However, they are not essential features for back boring crankshaft and camshaft bores according to one important aspect of the present invention.

From the foregoing description of boring machine 40, the arrangement and construction of boring machine 44 will be readily apparent. A crankshaft spindle 90 having a rotational axis 92 is mounted on a vertical slide 94 carried on a way 96 on a pedestal 98 which in turn is mounted on a transverse horizontal slide 100 on a way 102 on a platen 104. Platen 104 is mounted on a horizontal slide 106 carried on a way 108 on bed 30. Slide 94 is positioned in vertical directions (arrow 110) by a drive 112; slide 100 is positioned in horizontal directions (arrow 114) by a drive 116; and slide 100 is positioned in horizontal directions 117 transverse to shuttle path 34 by a drive 118. A tool changer 120 selects boring bar 43 and other boring bars and tools from a tool magazine 124.

Figure 3:
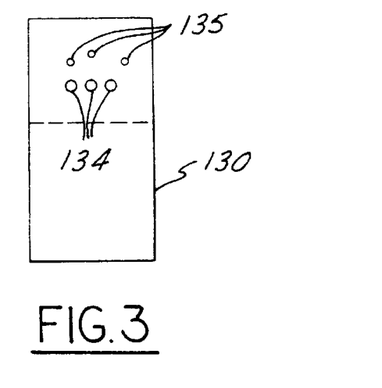
FIGS. 3 and 4 are semi-schematic views taken generally on lines 3—3 and 4—4 respectively and illustrating fixed supports having both inboard and outboard bushings for back boring crankshaft and camshaft bores whose locations vary for different engines.
Figure 4:
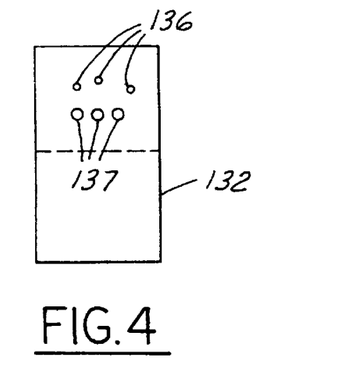
Figure 5:
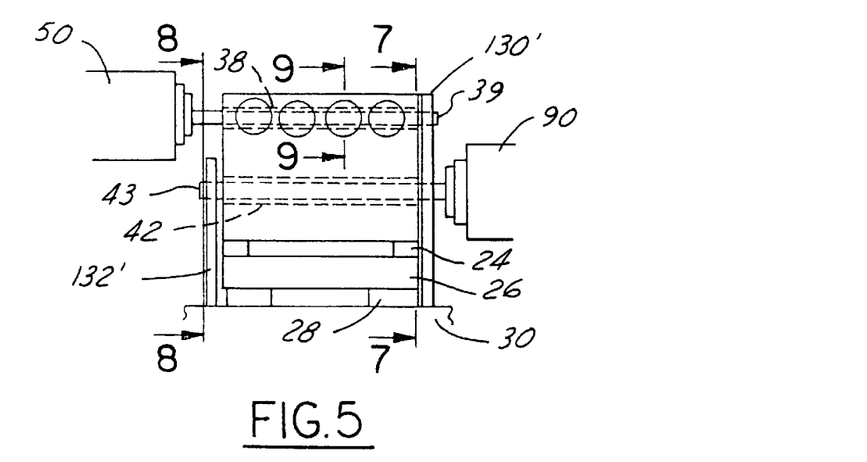
FIG. 5 is a fragmentary semi-schematic front view of FIG. 1 illustrating a simplified modification of the bushing supports.
Figure 6:
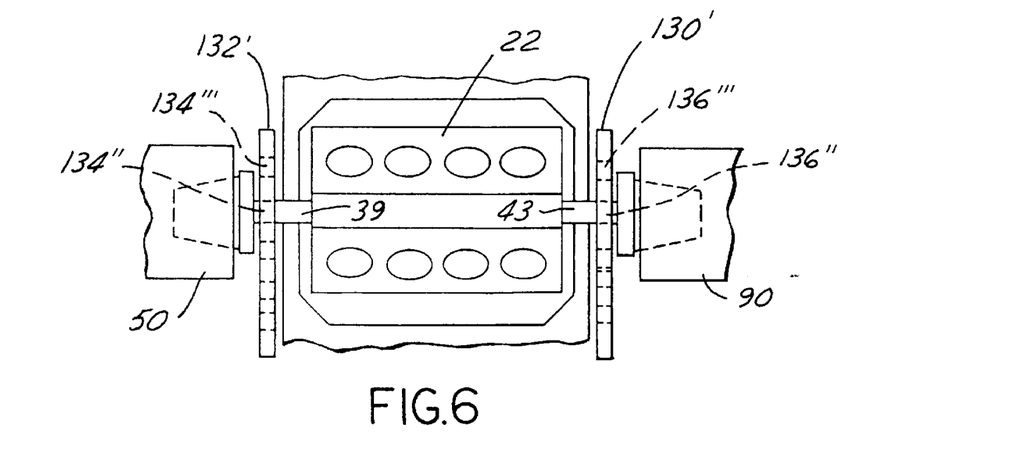
FIG. 6 is a fragmentary top view of FIG. 5.
Figure 7:
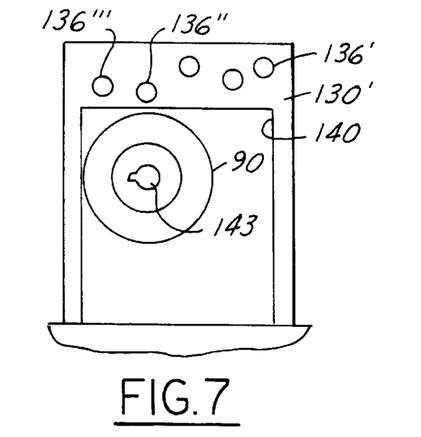
FIG. 7 is a view taken along line 7—7 of FIG. 5 schematically illustrating the crankshaft boring bar in its retracted position relative to outboard support bushings for camshaft boring bars for different engine blocks.

For the embodiment being described to back bore both camshaft and crankshaft bores on different engine blocks at one work station 20, station 20 also includes a pair of bushing plates 130, 132 schematically illustrated in FIGS. 3 and 4 and schematically shown as bushing plates 130', 132' in FIGS. 5–7 for a simplified embodiment. Bushing plate 130 is stationarily mounted on bed 30 at the right side of shuttle 26 adjacent one end of block 22 and opposite spindle 50 to locate and support the outboard distal end of boring bar 39 and to provide inboard location support of bar 43. Bearing plate 132 is stationarily mounted on bed 30 at the left side of shuttle 26 adjacent the other end of block 22 and opposite spindle 90 to locate and support the outboard distal end of boring bar 43 and provide inboard location and support of boring bar 39.

As shown in FIGS. 3 and 4, crankshaft bore locations for three different engine blocks correspond to three lower bushings 134 on plate 130 and three lower bushings 137 on plate 132. Camshaft bores for these three different engine blocks correspond to three upper bushings 135 on plate 130 and three upper bushings 136 on plate 132.

The three upper bushings 135 on plate 130 are outboard pilot support bushings for camshaft boring bars such as bar 39; bushings 134 on plate 130 are inboard pilot-support bushings for crankshaft boring bars such as bar 43; bushings 136 on plate 132 are inboard pilot-support bushings for camshaft boring bars such as bar 39; and bushings 137 on plate 132 are outboard pilot-support bushings for crankshaft boring bars such as bar 43. The inboard bushings are splined bushings which allow a cutting tool on a boring bar to pass through the bushing spline so that the tool passes through and exits the bushing at a predetermined angular position, i.e. horizontally and pointing toward conveyor 36, for reasons to be described hereinafter. Preferably spindles 50, 90 have conventional servomechanisms or stepper motors to stop the spindle and hence the tools at a predetermined angular position, i.e. so that cutting tools on the boring bars 39, 43 are oriented horizontally and pointing toward conveyer 36.

Compared to a first engine block represented by the leftmost pairs of locations or bushings 134, 135 and 136, 137 in FIGS. 3 and 4, a second engine block (represented by the middle pairs of locations or bushings) has the camshaft location 136 vertically higher. For a third engine block (represented by the bushings pairs at the right side of FIGS. 3 and 4), the camshaft bushings 135, 136 are horizontally offset from the crankshaft bushing 134, 137 as compared to the bushings for the first and second engine blocks. With any of the three engines properly located along path 34 relative to plates 130, 132, spindles 50, 90 and boring bars 39 and 43 can be accurately aligned with the crankshaft bushings 134, 137 and camshaft bushings 135, 136 respectively for a back boring operation on any of the engines.

Figure 11:
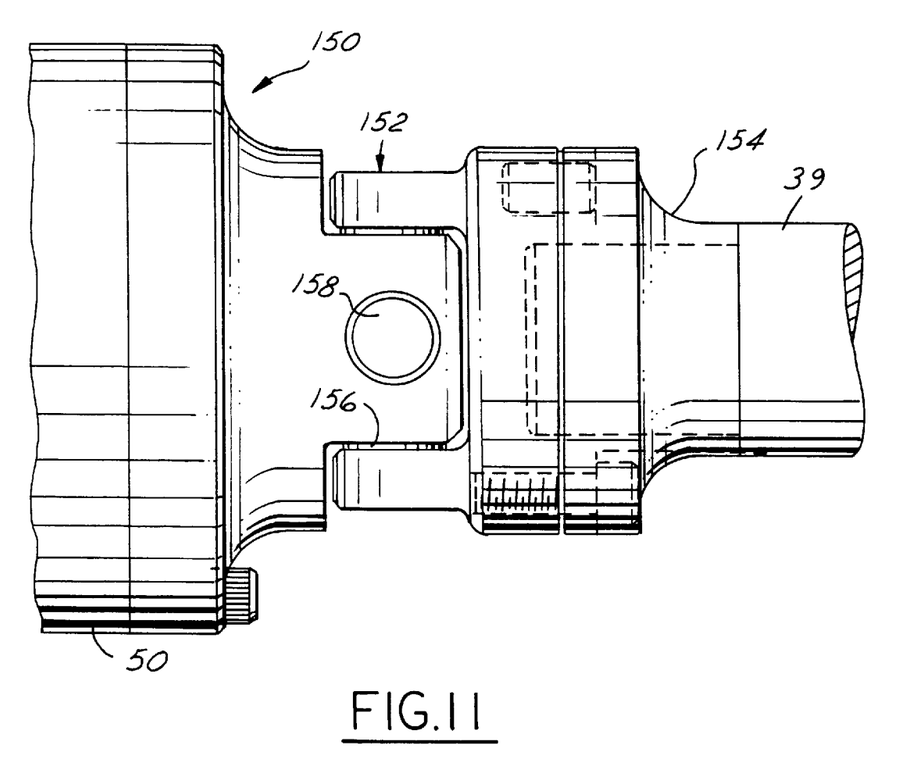
FIG. 11 is an enlarged fragmentary view of a floating adapter for mounting the boring bars on the spindles.

In the preferred embodiment the bushings 134–137 have close tolerances with the boring bars and are located very precisely on plates 130, 132. Plates 130, 132 are then stationarily located on the bed 30 with the bushing pairs aligned precisely as by known laser alignment techniques. With such close tolerances a floating adapter 150 (FIG. 11) is used on each spindle 50, 90 so that the spindles do not have to be located at their final machining positions with the great precision of the laser aligned bushings. Such floating adapters, per se, are known and have been used with single axis boring machines. As shown in FIG. 11, adapter 150 comprises a universal type joint 152 coupling spindle 50, for example, to a chuck driver 154 for boring bar 39. Universal joint 152 has transverse pivots 156 and 158 which allow boring bar 39 to pilot into the precisely aligned inboard and outboard support bushings 135, 136 on plates 130, 132 even though spindle 50 is not aligned within the close tolerances of the laser aligned bushings. Although laser aligned inboard and outboard support bushings are preferred, they are not required according to other important aspects of this present invention.

Figure 8:
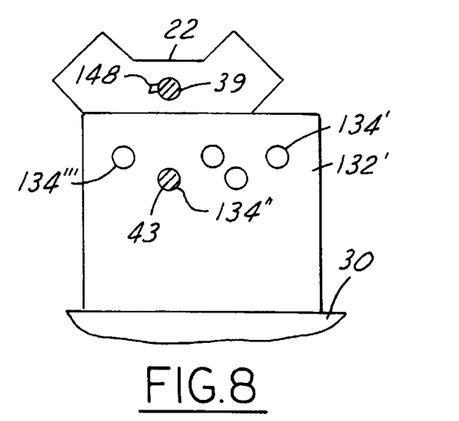
FIG. 8 is a view taken along line 8—8 of FIG. 5 schematically illustrating one set of camshaft and crankshaft boring bars and outboard support bushings for crankshaft boring bars for different engine blocks.

In FIGS. 7 and 8, inboard bushings have been eliminated to simplify description of the operation and illustrate a simplified embodiment of the invention without a floating adapter 150. For purposes of simplification, bushing plate 130' has a cutout 140 in place of inboard support bushings for boring bar 43 and five different outboard pilot-support bushings 136' for five different camshaft locations on five different engine blocks. Similarly, bushing plate 132' has five different outboard pilot-support bushings 134' for five different crankshaft locations on five different engine blocks and is illustrated without inboard support bushings for boring bar 39. The geometry of the five camshaft bushings 136' relative to the crankshaft bushings 134' corresponds to the geometry of corresponding camshaft and crankshaft bores on the five different engine blocks. By way of example and for purposes of illustrating the present invention, for a specific engine block 22, the outboard camshaft bushing is designated 136" (FIG. 7) and the outboard crankshaft bushing is designated 134" (FIG. 8).

SUMMARY OF OVERALL OPERATION

The overall operation of back boring crankshaft and camshaft bores should be apparent from the foregoing detailed description of the drawings. With the simplified bushing support plates 130', 132' (FIGS. 5–8) and a given engine block 22 being machined at station 20, the required camshaft boring bar 39 is automatically selected by tool changer 84 and chucked in spindle 50 and the required boring bar 43 is automatically selected by tool changer 120 and chucked in spindle 90. Where only one type of engine block 22 is being machined, the required boring bars 39, 43 will remain in spindles 50, 90 respectively until a different type of engine block is to be machined at station 20. Because block 22 is accurately located and clamped on pallet 24 and pallet 24 is accurately located and clamped on slide 26, slide 26 can be moved accurately by the CNC to accurately locate block 22 at its machining location 46 where shuttle 26 is clamped during the back boring operation. Similarly, under the control of the CNC, spindles 50 and 90 are accurately moved to their machining location 46 with camshaft boring bar 39 aligned with its outboard support bushing 136" and crankshaft boring bar 43 aligned with its outboard bushing 134" as illustrated in FIGS. 5–8.

Figure 9A:
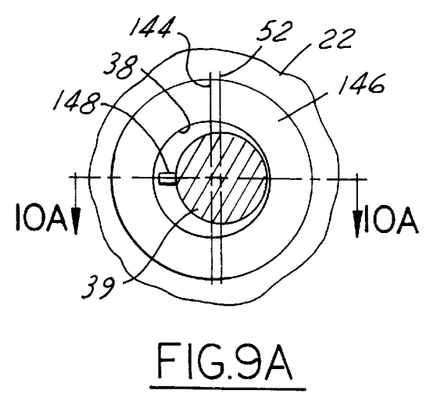
FIG. 9A is an enlarged fragmentary vertical sectional view taken generally on line 9—9 of FIG. 5 to illustrate the relationship between a bearing bore and a boring bar when the engine block is horizontally offset from a final machining position.
Figure 9B:
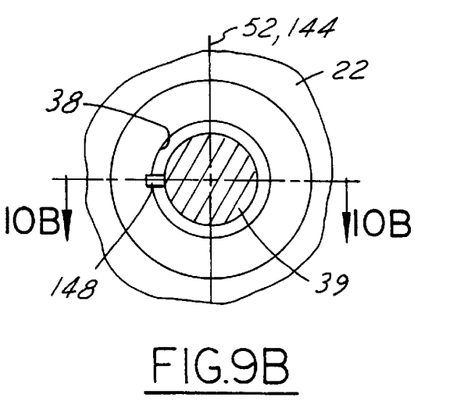
FIG. 9B shows the boring bar and bore coaxial relationship when the block is moved to its final machining position.
Figure 10A:
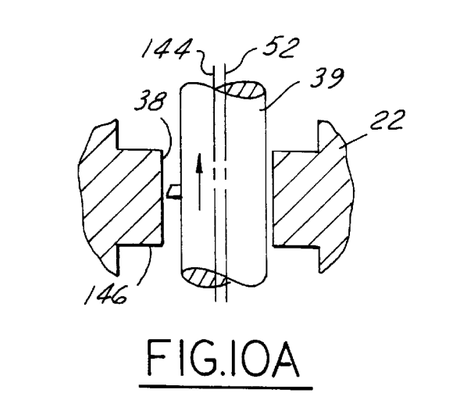
FIGS. 10A and 10B are enlarged fragmentary horizontal sections taken on lines 10A—10A and 10B—10B of FIGS. 9A and 9B respectively.
Figure 10B:
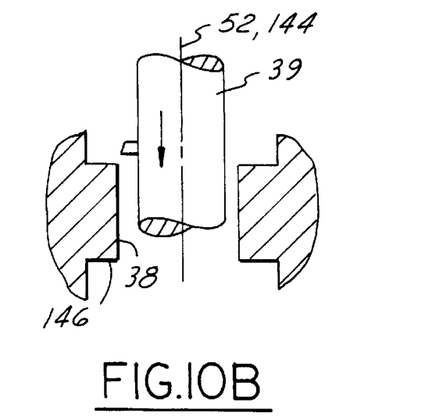

In order to insert boring bars 39, 43 through their respective camshaft bore 38 and crankshaft bore 42, just before block 22 reaches its final machining position 46, shuttle 22 stops to provide a horizontal offset between the axes 52, 92 of boring bars 39, 43 relative to the axes of the camshaft bore 38 and crankshaft bore 42. As illustrated in FIGS. 9A and 10A, block 22 has stopped short, slightly to the left as viewed in FIGS. 9A, 10A, of the final machining position 46 (FIGS. 9B, 10B). Axis 144 of bore 38 on a camshaft bearing block 146 is offset horizontally toward the left from axis 52 of boring bar 39. With the horizontally offset axes 52, 144, sufficient radial clearance is provided for boring bar 39 and its radially-projecting cutting tools 148 to pass through bore 38. Although only one bearing block 146 and one cutting tool 148 are illustrated in FIGS. 9A, 10A, it will be apparent that for each bearing location, there will be a corresponding bearing block 146 and cutting tool 148.

As described herein above, the cutting tools 148 are oriented generally horizontally pointing toward conveyer 36 by known techniques such as automatic servo or stepper motor orientation of the motorized spindles 50, 90. When camshaft boring bar 39 is extended through engine block 22 and into bushing 136", each of the cutting tools 148 clears beyond its associated bearing block 146. Similarly, although not illustrated in detail, while block 22 is in its offset position, crankshaft boring bar 43 can be extended through block 22 and into bushing 134". Shuttle 26 and block 22 are then jogged forwardly in a horizontal direction (toward the right in FIG. 9A, 10A and downwardly as viewed in FIGS. 1 and 6) to coaxially align boring bar axis 52 with bore axis 144 (FIGS. 9B, 10B) and position the cutting tools 148 for back boring bore 38 as shown in FIGS. 5, 6, 9B and 10B. With spindle 50 rotating, boring bar 39 is retracted (moving from right to left as viewed in FIG. 5 and downwardly in FIG. 10B) to back-bore the bore 38. When the cutting tools 148 have cleared each of the bearing blocks 146, the CNC jogs shuttle 26 and block 22 back to the offset position illustrated in FIGS. 9A and 10A so that boring bar 39 can be rapidly withdrawn from block 22. In a similar manner, boring bar 43 is retracted simultaneously with boring bar 39, moving from left to right as viewed in FIG. 5, to back-bore the bore 42.

After boring bars 39 and 43 are fully retracted, shuttle 26 moves to its load-unload position where pallet 24 is released and pallet 24 and block 22 are transferred back to the open position on conveyor 36. Conveyor 36 is then indexed to move block 22' toward the right as viewed in FIG. 1, and pallet 24' and block 22' are then transferred to, accurately located on and clamped to shuttle 26. So long as blocks 22, 22' are of the same engine type, spindles 50, 90 remain in the same positions relative to the engine block and outboard bushings 136" and 134".

In general, a predetermined horizontal offset between one of the bores and its associated boring bar is sufficient so that both boring bars can be extended through their associated bores simultaneously. Hence shuttle 26 and block 22 are only jogged once to reach the final machining position. Although bores 38 and 42 are back bored simultaneously by retracting spindles 52, 90 simultaneously, they could also be back bored successively. In either case, by back boring more than one bore, such as camshaft bore 38 and crankshaft bore 34, without moving block 22, the bores are precisely located relative to each other and cycle time is minimized. With the flexibility of station 20, it will be apparent that boring bar insertion and back boring can also be done consecutively and, if required, the workpiece can be jogged between offset and final positions for various machining operations as required by the workpiece configuration. However, for back boring crankshaft and camshaft bores on one engine block, it is preferred that the block remain fixed at one location.

With the flexible design of the boring machines and boring method described herein above for one engine block type, the present invention is particularly suited for use on an engine line successively machining engine blocks of different types, e.g., different camshaft and crankshaft locations relative to each other, and/or even a different part such as a cylinder head having either one or two camshaft bores. This is achieved by using available CNC technology and sensing the part type to be machined next. Preferably, when a workpiece such as an engine block 22 is mounted and located precisely on a pallet 24, the engine block or other workpiece identification is entered on a magnetic read/write tag on the pallet. The workpiece identification is then read as the workpiece enters station 20. The CNC is programmed with all of the data necessary to machine all of the workpieces to be machined at station 20. Consequently, after the workpiece is identified to the CNC, it will know what tools to select; where to locate shuttle 26 for its final machining and its offset positions; final machining locations for spindles 50, 90 and other machining parameters and sequences.

For example, assuming engine block 22' has camshaft and crankshaft bearing bore locations (bushings 136''' and 134''', FIGS. 7 and 8) which differ from engine block 22, the CNC is programmed to move slides 54 and 66 to align spindle 50 with bushing 136''' and move slides 94 and 100 to align spindle 90 with bushing 134'''. If different boring tools are required for the different engine type, tool changers 84, 120 are instructed by the CNC to select the appropriate boring bars from magazines 88 and 124. After pallet 24' is loaded, located and clamped on shuttle 26, block 22' can be moved to its machining position, first to a position with the boring bars and bearing bores horizontally offset to insert the boring bars through the block, and then jogged slightly to align the boring bar axes with their respective bores to perform the back boring operations.

Although the overall operation has been described based on the simplified embodiment of FIGS. 5–8, where block inboard and outboard bushings, preferably laser aligned, are required (FIGS. 1–4), the overall operation is substantially as described hereinabove. With spindles 50, 90 at their machining positions, and block 22 at its horizontally offset position, this camshaft boring bar 39 is piloted through its inboard support bushing 136 and into its outboard support bushing 135. Similarly, crankshaft boring bar 43 is piloted through its inboard support bushing 134 and into its outboard support bushing 137. Shuttle 26 then shifts block 22 to its final machining position. Thereafter, the spindles are energized and actuated to perform the back-boring operations.

In the embodiments described herein above, accurate positioning of the engine block 22 or 22' at its machining location relative to spindles 52, 90 is readily achieved, Before entering station 20, each block 22, 22' has been precisely located on its respective pallet 20, 24'. The pallet in turn is precisely located and clamped on shuttle 26 when the block and its pallet are transferred from conveyor 36 to shuttle 26. Finally, shuttle 26 is clamped to bed 30 when the block is in its final machining position. Because shuttle 26 moves only along a horizontal path and is of rugged construction, it provides a simple, rugged and precision arrangement for part transfer, part locating and part clamping at the final machining position. This is particularly advantageous in handling severe machine forces, as with two back boring operations performed on engine blocks, without relocating the block and whether performed simultaneously or successively. Moreover, flexibility for machining different engines is greatly enhanced by the arrangement of the shuttle 26, at least one three axis boring machine 40, 44 and a multiple bushing plate 130, 132.

From the foregoing descriptions, other modifications of the present invention will be readily apparent, for example back boring one or more camshaft bores in a cylinder head or one or more bores in otherworkpieces. By sensing the type of workpiece entering the work station, the CNC can select the appropriate boring bar or other tool for that part, move one or both of the spindles 50, 90 to its machining location and locate shuttle 26, including whatever horizontal jog is required for that part to insert the boring bar and perform the back boring operation. As contrasted to prior art boring machines with a single fixed-axis spindle, the present invention provides practically total flexibility to accommodate part variations.

Two opposed three-axis boring machines as described herein above are preferred for back boring crankshaft and camshaft bores. However, other arrangements of one or more three-axis boring machines in combination with a shuttle moving only along a horizontal path could be preferred for other workpieces. For example, a third three-axis boring machine could be mounted at station 20 so that the spindle can be extended and retracted on a vertical axis and/or more than one boring machine can be located at the same side of shuttle 26. Similarly, as described herein above, the horizontal offset required to insert the boring bar was achieved by stopping shuttle 26 before it reached the final machining position. However, other jogging sequences may be used, e.g. shuttle 26 can overshoot the final machining position to provide the offset required and then return to the final machining position. Of course for this sequence, cutting tools on boring bars, for example, would be appropriately pre-positioned, e.g., to point horizontally away from conveyer 36. Different jogs can also be used for different tools, particularly where two or more bores are machined successively without moving the part out of the work station. In any event, the cutting tools on the boring bar will be angularly oriented in a generally horizontal direction, pointing away from the final machining position so as to clear the bores when the workpiece is in its horizontally offset position.

It will be understood that the boring machine and method have been described herein above for purposes of illustration and are not intended to indicate limits of the present invention, the scope of which is defined by the following claims.

What is claimed is:

1. Apparatus for back boring a first bore in a workpiece, said bore having a first radius, comprising:

a bed, a work holder shuttle carried on said bed for movement along a straight-line horizontal path and arranged and constructed to receive and retain the workpiece thereon with said bore having a longitudinal bore axis extending in a first direction transverse to said path, a first rotatable spindle adapted to receive a first boring bar for back boring said bore and to support the boring bar for rotation about and reciprocal motion along a spindle axis disposed transverse to said path, the boring bar being of the type having a radially-projecting cutting tool so that the boring bar has a radius at the cutting tool greater than said bore radius, said spindle being located adjacent one side of said path and carried on said bed by a three-axis support for universal movement horizontally parallel to said path and vertically to coaxially align said spindle axis with said bore axis along a back boring axis when the workpiece is in a final machining position and for movement along said spindle axis to extend and retract the boring bar along said back boring axis during a back boring operation, a shuttle drive operatively connected to said shuttle and configured to move said shuttle along said path and locate the workpiece along said path at a position only horizontally offset from said final machining position such that said bore axis is parallel to and offset from said back boring axis, to provide for inserting a boring bar into said bore and passing a cutting tool of the boring bar through said bore, a spindle drive operatively connected to said spindle and configured to coaxially align said spindle axis with said back boring axis and to advance said spindle along said back-boring axis only when the workpiece is at its horizontally offset position such that a boring bar supported in said spindle is inserted through said bore along said back boring axis and spaced from said bore axis, and said spindle drive additionally configured to withdraw said spindle along said back-boring axis only when said workpiece is in its final machining position with said bore coaxially aligned with said back-boring axis such that the boring bar supported in said spindle is retracted along said bore axis to back bore said bore.

2. Apparatus for back boring a first bore in a workpiece, said bore having a first radius, comprising:

a bed, a work holder shuttle carried on said bed for movement along a straight-line horizontal path and arranged and constructed to receive and retain said workpiece thereon with said bore having a longitudinal axis extending in a first direction transverse to said path, a first rotatable spindle adapted to receive a first boring bar for back boring said bore, said boring bar being of the type having a radially-projecting cutting tool so that said boring bar has a radius at said cutting tool greater than said bore radius, said spindle being located adjacent one side of said path and carried on said bed by a three-axis support for universal movement horizontally and vertically to locate said spindle relative to said bore when said workpiece is in its final machining position and horizontally transverse to said path to extend and retract said boring bar during a back boring operation, a shuttle drive operatively connected to said shuttle to move said shuttle along said path and locate said workpiece along said path at a position horizontally offset from said final machining position to provide clearance for inserting said boring bar into said bore, a first outboard bushing support stationarily mounted on said bed at a side of said path opposite said first spindle, said bushing support having a first bushing therein and being positioned along said path so that said first bushing is coaxial with said boring bar and said bore when said workpiece is at said final machining position and when said workpiece is at said offset position a distal end of said boring bar can be inserted through said bore and into said bushing to support said boring bar when it is retracted during back boring of said bore, whereby when said workpiece is at its horizontally offset position and said spindle is at its final machining position, said spindle can be extended horizontally transverse to said path to insert said boring bar through said bore, said shuttle can then be moved horizontally along said path to locate said workpiece at its final machining position and then said spindle can be retracted to back bore said bore.

3. The apparatus set forth in claim 2 for use in successively back boring said first bore and then back boring a second bore in a second workpiece, and wherein said outboard bushing plate has a second bushing therein for coaxial alignment with said second bore and a second boring bar when said second workpiece is in its final machining location.

4. The apparatus set forth in claim 1 wherein said three-axis support comprises a first slide movable horizontally parallel to said path, a second slide movable vertically transverse to said path, and a third slide movable horizontally transverse to said path, said spindle being mounted on said third slide and one of said first and second slides being mounted on said bed.

5. The apparatus set forth in claim 1 further comprising a control system for moving said spindle to its final machining position, locating said shuttle at its horizontally offset position to provide a clearance sufficient to insert said boring bar through said bore, extend said spindle to insert said boring bar through said bore, and then jog said shuttle horizontally to its final machining position with said boring bar coaxially aligned with said bore axis and then retract said spindle to back bore said bore.

6. The apparatus set forth in claim 1 for use in back boring a second bore in said workpiece, said second bore having a second radius, and said apparatus further comprises a second spindle adapted to receive a second boring bar for back boring said second bore, said second spindle being located at a side of said path opposite said first spindle and carried on said bed by a three-axis support for universal movement horizontally and vertically to locate said second spindle coaxial with said second bore when said second workpiece is in its final machining position and horizontally transverse to said path to extend and retract said second boring bar, said second boring bar being of the type having a second radially-projecting cutting tool and a second cutting tool radius which is greater than said second bore radius so that when said shuttle positions said workpiece at said horizontally offset position and said second spindle is at said final machining position, said second spindle can be moved horizontally transverse to said path to insert said second boring bar through said second bore, said shuttle can then be moved along said path to locate said workpiece at said final machining position and said second spindle can be retracted to back bore said second bore.

7. Apparatus for back boring a first bore and a second bore in a workpiece, said first bore having a first radius, and said second bore having a second radius comprising:

a bed, a work holder shuttle carried on said bed for movement along a straight-line horizontal path and arranged and constructed to receive and retain said workpiece thereon with said first and second bores each having a longitudinal axis extending in a first direction transverse to said path, a first rotatable spindle adapted to receive a first boring bar for back boring said bore, said first boring bar being of the type having a radially-projecting cutting tool so that said boring bar has a radius at said cutting tool greater than said first bore radius, said first spindle being located adjacent one side of said path and carried on said bed by a three-axis support for universal movement horizontally and vertically to locate said spindle relative to said first bore when said workpiece is in its final machining position and horizontally transverse to said path to extend and retract said first boring bar during a back boring operation, a first outboard bushing support stationarily mounted on said bed at a side of said path opposite said first spindle, said first bushing support having a first bushing therein and being positioned along said path so that said first bushing is coaxial with said first boring bar and said first bore when said workpiece is at said final machining position to support a distal end of said first boring bar during back boring of said first bore, a second spindle adapted to receive a second boring bar for back boring said second bore, said second spindle being located at a side of said path opposite said first spindle and carried on said bed by a three-axis support for universal movement horizontally and vertically to locate said second spindle coaxial with said second bore when said second bore is in its final machining position and horizontally transverse to said path to extend and retract said second boring bar, said second boring bar being of the type having a second radially-projecting cutting tool and a second cutting tool radius which is greater than said second bore radius, a second outboard bushing support stationarily mounted on said bed at said one side of said path opposite said second spindle, said second bushing support having a second bushing therein coaxial with said second boring bar and said bore when said workpiece is at said final machining position to support a distal end of said second boring bar during back boring of said second bore, a shuttle drive operatively connected to said shuffle to move said shuffle along said path and locate said workpiece along said path at a position horizontally offset from said final machining position to provide clearance for inserting said boring bar into said first bore, and said second boring bar into said second bore, whereby when said workpiece is at its horizontally offset position and said first spindle is at its final machining position, said first spindle can be extended horizontally transverse to said path to insert said boring bar through said bore, said shuttle can then be moved horizontally along said path to locate said workpiece at its final machining position and then said first spindle can be retracted to back bore said bore, and when said shuttle positions said workpiece at said horizontally offset position and said second spindle is at said final machining position, said second spindle can be moved horizontally transverse to said path to insert said second boring bar through said second bore, said shuttle can then be moved along said path to locate said workpiece at said final machining position and said second spindle can be retracted to back bore said second bore.

8. The apparatus set forth in claim 7 for use in successively back boring said first and second bores in said first workpiece and then back boring third and fourth bores in a second workpiece, and wherein said first outboard bushing plate has a third bushing coaxial with said third bore when said second workpiece is in its final machining location and said second outboard bushing plate has a fourth bushing therein coaxial with said fourth bore when said second workpiece is in its final machining location.

9. The apparatus set forth in claim 6 wherein said three-axis supports for said first and second spindle each comprise a first slide movable horizontally parallel to said path, a second slide movable vertically to said path, and a third slide movable horizontally transverse to said path, said first spindle being mounted on said third slide of said first three-axis support and one of said first and second slides of said first three-axis support being mounted on said bed, and said second spindle being mounted on said third slide of said second three-axis support and one of said first and second slides of said second three axis support being mounted on said bed.

10. The apparatus set forth in claim 6 further comprising a control system for locating said first spindle at its final machining position, locating said second spindle at its final machining position, locating said slide at said horizontally offset position, extending said first spindle to insert said first boring bar through said first bore, extending said second spindle to insert said second boring bar through said second bore, and then jog said shuttle to its final machining position with said first boring bar coaxially aligned with said first bore axis and said second boring bar coaxially aligned with said second bore axis, and then retracting said first and second spindles to back bore said first and second bores.

11. The apparatus set forth in claim 6 wherein at least one of said bores in said first workpiece has a first diameter and one of said bores in said second workpiece has a second diameter different from said first diameter, and wherein said apparatus further comprises a tool magazine having at least two boring bars therein, and a tool changer for selecting one of said boring bars from said tool magazine for back boring said first bore in said first workpiece and then selecting the other boring bar in said tool magazine for back boring said one bore in said second workpiece.

12. A work station for back boring both crankshaft and camshaft bearing bores on an engine block comprising:

a base, a shuttle carried on said base for movement along a first straight-line horizontal path and arranged and constructed to receive and clamp said engine block thereon with opposed ends of said block facing in opposite directions so that said crankshaft bearing bore and said camshaft bearing bore both extend horizontally transverse to said first path, said bores having respective longitudinal bore axes, said shuttle being movable along said path to move said block into and out of said station, locate said block at a final machining position, and locate said block at a position offset only horizontally from said final machining position, a first spindle adapted to receive a first boring bar for back boring said camshaft bore, said first spindle being located adjacent one side of said path and carried on said base by a three-axis support for universal movement horizontally and vertically transverse to said path to locate said spindle relative to said camshaft bore when said block is in its final machining position and horizontally along a first longitudinal spindle axis transverse to said path to extend and retract said first boring bar to back bore said camshaft bore, said first boring bar being the type having a radially-projecting cutting tool with the radius of said first boring bar at said cutting tool being greater than said camshaft bore radius, a second rotatable spindle adapted to receive a second boring bar for back boring said crankshaft bore, said second spindle being located adjacent the other side of said path opposite said first spindle and being carried on said base by a second three-axis support for universal movement horizontally and vertically to said path to locate said second spindle relative to said crankshaft bore when said block is in said final machining position and horizontally along a second longitudinal spindle axis transverse to said path to extend and retract said second boring bar to back bore said crankshaft bore, said second boring bar being of the type having a radially-projecting cutting tool with the radius of the second boring bar at said second cutting tool being greater than said crankshaft bore radius, a shuttle drive operatively connected to said shuttle and configured to move said shuttle along said path and to selectively locate said block at said offset position and said final machining position, and a spindle drive operatively connected to each said spindle and configured to extend said first and second boring bars through said camshaft bore and said crankshaft bore, respectively, only when said engine block is at said horizontally offset position and said first and second spindle axes are spaced from said respective bore axes and said drive further configured to rotate and retract said boring bars only when said engine block is disposed at its final machining position and said spindle axes are aligned with said respective bore axes back bore the respective camshaft and crankshaft bearing bores.

13. The work station set forth in claim 12 comprising
a pallet,
said block being rigidly clamped on said pallet before it enters said work station, said pallet being rigidly clamped on said shuttle after it enters said work station and said shuttle being rigidly clamped to said bed when said block is in said final machining position.

14. The apparatus set forth in claim 12 wherein said first three-axis support and said second three-axis support each comprise
respective first slides movable horizontally parallel to said path,
second slides movable vertically transverse to said path, and
third slides movable horizontally transverse to said path, said first spindle is mounted on said third slide of said first three-axis support and one of said first and second slides in said first three-axis support is mounted on said base, and said second spindle is mounted on said third slide of said second three-axis support and one of said first and said second slides in said second three-axis support is mounted on said bed.

15. A work station for successively back boring crankshaft and camshaft bores on a first engine block and a second engine block having crankshaft and camshaft bores arranged in a second geometry which varies from a first geometry of said crankshaft and camshaft bores on said first engine block, comprising
a base,
a shuttle carried on said base for movement along a first straight-line horizontal path and arranged and constructed to receive and clamp said first engine block thereon with opposed ends of said block facing in opposite directions so that said crankshaft bearing bore and said camshaft bearing bore both extend horizontally transverse to said first path,
said shuttle being movable along said path to move said first block into and out of said station, locate said block at a final machining position, and locate said block at a position offset horizontally from said final machining position,
a first spindle adapted to receive a first boring bar for back boring said camshaft bore,
said first spindle being located adjacent one side of said path and carried on said base by a three-axis support for universal movement horizontally and vertically transverse to said path to locate said spindle relative to said camshaft bore when said first block is in its final machining position and horizontally transverse to said path to extend and retract said first boring bar to back bore said camshaft bore,
said first boring bar being of the type having a radially-projecting cutting tool with the radius of said first boring bar at said cutting tool being greater than said camshaft bore radius,
a second rotatable spindle adapted to receive a second boring bar for back boring said crankshaft bore,
said second spindle being located adjacent the other side of said shuttle path opposite said first spindle and being carried on said base by a second three-axis support for universal movement horizontally and vertically to said path to locate said second spindle relative to said crankshaft bore when said first block is in said final machining position and horizontally transverse to said path to extend and retract said second boring bar to back bore said crankshaft bore,
said second boring bar being of the type having a radially-projecting cutting tool with the radius of the second boring bar at said second cutting tool being greater than said crankshaft bore radius,
a camshaft outboard bushing plate having first and second bushings therein,
a crankshaft outboard bushing plate also having first and second bushings therein,
said first bushing plate being stationarily mounted on said bed adjacent said path opposite said first spindle, said second bushing plate being stationarily mounted on said bed adjacent said path opposite said second spindle, and wherein
said first bushing on said camshaft bushing plate and said first bushing on said crankshaft bushing plate are located according to said first geometry of said camshaft bore and said crankshaft bore on said first engine block and
said second bushing on said camshaft bushing plate and said second bushing on said crankshaft bushing plate are located according to said second geometry of said camshaft and crankshaft bearing bores on said second block,
a shuttle drive operatively connected to said shuttle to move said shuttle along said path and thereby selectively locate said block at said offset position and said final machining position,
whereby when said engine block is at said horizontally offset position and said first and second spindles are at their final machining positions, said first and said second boring bars can be extended through said camshaft bore and said crankshaft bore, respectively, said shuttle can be moved along said path to locate said engine block at its final machining position and said boring bars can be retracted to back bore their respective camshaft and crankshaft bearing bores.

16. The work station set forth in claim 15 further comprising a control system for
moving said first spindle and said first boring bar to a final machining position for said first block with said first spindle and said first bar being coaxially aligned with said first bushing in said camshaft bushing plate,
moving said second spindle and a second boring bar to a final machining position for said first block with said second spindle and said second boring bar being coaxially aligned with said first bushing on said crankshaft bushing plate,
moving said shuttle and said first block to its horizontally offset position, then extending said first spindle to insert a first camshaft boring bar through said camshaft bore and into said first bushing on said camshaft bushing plate and extending said second spindle to insert a second boring bar through said crankshaft bore and into said first outboard bushing support on said crankshaft bushing support,
then moving said first engine block to its machining position with the axes of said first and second boring bars coaxial with said first camshaft bore and said first crankshaft bore,
then retracting said first and second spindles to back bore said first camshaft bore and second crankshaft bore,
transferring said first engine block out of said station, replacing said first boring bar with a third boring bar and said second boring bar with a forth boring bar,
moving said first spindle and said third boring bar and said second spindle and said fourth boring bar to final machining positions for said second block with said first spindle and said third boring bar being coaxially aligned with said second bushing in said camshaft outboard support and said second spindle and said fourth boring bar being coaxially aligned with said second bushing in said crankshaft bushing support, transferring said second block into said station and onto said shuttle, moving said shuttle and said second block to a position offset horizontally from a final machining position for said second block, then extending said first and second spindles to insert said third and said fourth boring bars into their respective camshaft and crankshaft bores on said second engine block, then moving said shuttle and said second block to said final machining position for said second block, and then retracting said first and second spindles to back-bore their respective camshaft and crankshaft bores on said second engine block.

17. The method of back boring a first bore in a workpiece, said bore having a predetermined radius, comprising the steps of moving said workpiece along a horizontal path to a first position offset horizontally from a final machining position for said first workpiece, providing a first rotatable spindle with a first boring bar for back boring said bore, said boring bar being of the type having a radially-projecting cutting tool with the radius of said boring bar at said cutting tool being greater than said bore radius, moving said spindle adjacent one side of said path horizontally parallel to said path and vertically transverse to said path to precisely locate-said first boring bar at its final machining position so that said boring bar will be coaxial with said bore when said workpiece is later moved to its final machining position, angularly orienting said cutting tool generally horizontally so that it will clear said bore when said workpiece is in said offset position, moving said spindle horizontally transverse to said path to extend said boring bar through said first bore while said workpiece is in said offset position, and then jogging said shuttle and said workpiece only horizontally from said offset position to said final machining position and then retracting said spindle to back bore said bore.

18. The method set forth in claim 17 for successively back boring said first bore and then back boring a second bore in a second workpiece, said second bore having a location on said second workpiece which varies from said bore location on said first workpiece, said method comprising the further steps of transferring said first workpiece horizontally along said path away from said spindles, transferring said second workpiece along said path to a position horizontally offset from a final machining position for said second workpiece, moving said spindle in at least one direction from said final machining position for said first workpiece to locate said first spindle so that it will be coaxially aligned with said second bore in said second workpiece when said second workpiece is later moved to its final machining position, moving said spindle with a boring bar thereon in said horizontal transverse direction to extend said boring bar through said second bore of said second workpiece when it is in said horizontally offset position, jogging said second workpiece only horizontally along said path from said second workpiece offset position to said final machining position, for said second workpiece, and then retracting said spindle to back bore said second bore in said second workpiece.

19. The method set forth in claim 17 wherein said workpiece has a second bore parallel to said first bore, said second bore also having a predetermined radius, and said method further comprises providing a second rotatable spindle with a second boring bar for back boring said second bore, moving said second spindle adjacent a side of said path opposite said first spindle to locate said second spindle so that said second boring bar will be coaxial with said second bore when said first workpiece is moved to its final machining position, moving said second spindle in a horizontal transverse direction opposite from said first spindle while said workpiece is at its horizontally offset position to extend said second boring bar through said second bore, and then retracting said second boring bar to back bore said second bore after said workpiece has been jogged horizontally to its final machining position.

20. The method set forth in claim 19 wherein said first and second boring bars are substantially simultaneously inserted through said bores when said workpiece is in its offset position and substantially simultaneously retracted when said workpiece is in its final machining position.

21. A work station for boring a first bore in a first workpiece and then a second bore in a second workpiece comprising:

a bed, a work transfer arranged and constructed to transfer said first workpiece into said work station to a first final machining position and then out of said work station at the completion of a first boring operation and then transfer said second workpiece into said work station to a second final machining position and then out of said work station at the completion of a second boring operation, said first and second bores having longitudinal axes extending in a direction transversely of said work station when said workpieces are in their final machining positions, a first rotatable spindle arranged and constructed to receive and operatively retain boring tools, said spindle being located adjacent one side of said machining positions in said transverse direction and being carried on said bed by a three-axis support for universal movement horizontally and vertically on first and second axes to locate said spindle relative to said bores when said workpieces are in their final machining positions and movable in said transverse direction along a third axis to extend and retract boring tools during boring operations, a first support bushing stationarily mounted on said bed adjacent said first final machining position in said transverse direction and a second support bushing stationarily mounted on said bed adjacent said second final machining position in said transverse direction, said first bushing being precisely located on said bed relative to said first final machining position to receive and coaxially support a first boring tool on said spindle when said spindle and said first workpiece is at said first final machining position during said first boring operation and said second bushing being precisely located on said bed relative to said second final machining position to receive and coaxially support a second boring tool when said spindle and said second workpiece are at said second final machining position during said second boring operation.

22. The apparatus set forth in claim 21 further comprising:

a control system operative to transfer said first workpiece to said first final machining position, move said spindle on said first and said second axes to align said first boring tool with said first bushing, extend and retract said spindle to insert and retract said first boring tool into and out of said first bore while supporting said first boring tool in said first bushing during said first boring operation, transfer said first workpiece out of its final machining position and out of said work station, transfer said second workpiece to said second final machining position, move said spindle on said first and said second axes to align said second boring tool with said second bushing, and then extend and retract said spindle to insert and retract said second boring bar into and out of said second bore while supporting said second boring tool in said second bushing during said second boring operation.

23. The work station set forth in claim 21 wherein one of said boring tools has a cutting tool adjacent its distal end to bore one of said bores as said one boring tool is extended through said one bore, and one of said bushings is an inboard support bushing for said one boring tool and is stationarily mounted on said bed at said one side of said machining positions.

24. The machining station set forth in claim 23 further comprising:

a floating adaptor on said spindle for receiving and retaining said one boring tool for co-rotation with said spindle while permitting slight horizontal and vertical movement within a first tolerance, and wherein said one bushing has a second tolerance substantially less than said first tolerance so that said one boring tool is located precisely by said one bushing when said spindle inserts said one boring tool into said one bushing and said one bore.

25. The work station set forth in claim 23 wherein said first workpiece has another bore located relative to said first bore according to a first predetermined geometry, and said work station further comprises a third bushing stationarily mounted on a bed adjacent said first final machining position in said transverse direction, said third bushing being located relative to said first bushing corresponding to said first predetermined geometry.

26. The work station set forth in claim 25 further comprising:

a second rotatable spindle arranged and constructed to receive and operatively retain another boring tool for boring said other bore in said first workpiece, said second spindle being located adjacent a side of said first machining position opposite said first spindle and being carried on said base by a second three-axis support for universal movement horizontally and vertically on first and second axes to align said second spindle with said other bore in said first workpiece when said first workpiece is in said first final machining position and moveable in said transverse direction along a third axis to extend and retract said other boring tool and bore said other bore in said first workpiece, and said third bushing being mounted on said bed at said opposite side of said first machining position.

27. The work station set forth in claim 25 wherein said first, said second and said third bushings are carried on a common support plate stationarily mounted on said bed.

28. The work station set forth in claim 21 wherein said first boring tool is a first boring bar arranged and constructed to back bore said first bore, said first bushing is an outboard bushing stationarily mounted on said bed at a side of said first machining position opposite said first spindle, and said first boring bar and said first spindle are aligned with said first bushing when said first work piece and said first spindle are in their final machining positions.

29. The work station set forth in claim 28 further comprising a first inboard support bushing stationarily mounted on said bed at said one side of said first machining position coaxially aligned with said first outboard bushing.

30. The work station set forth in claim 28 for use in back boring said first bore and another bore in said first workpiece and further comprising:

a second rotatable spindle arranged and constructed to receive and operatively retain another boring bar for back boring said other bore in said first workpiece, said second spindle being located adjacent the other side of said first machining position opposite said first spindle and being carried on said base by a second three-axis support for universal movement horizontally and vertically on first and second axes to align said second spindle with said other bore in said first workpiece when said first workpiece is in said first final machining position and moveable in said transverse direction along a third axis to extend and retract said other boring bar and back bore said other bore in said first workpiece, and a third support bushing stationarily mounted on said bed adjacent said first machining position at said one side thereof opposite said second spindle, said third bushing being precisely located relative to said first final machining position to receive and coaxially support a distal end of said other boring bar when said first workpiece and said second spindle are at their final machining positions.

31. The work station set forth in claim 30 wherein said first bushing and said third bushing are carried on a first support plate fixedly mounted on said bed at said one side of said machining positions.

32. The work station set forth in claim 31 wherein said second bushing is carried on a second support plate fixedly mounted on said bed at said opposite side of said machining positions.

33. The work station set forth in claim 32 wherein said first support plate has at least two pairs of support bushings, one bushing in each pair being an outboard bushing for boring bars on said second spindle and the other bushing in each pair being an inboard bushing for boring bars on said first spindle.

34. The work station set forth in claim 33 wherein said second support plate has at least two pairs of support bushings, one bushing in each pair being an outboard bushing for boring bars on said first spindle and the other bushing in each pair being an inboard bushing for boring bars on said second spindle.

35. The work station set forth in claim 28 further comprising
- a floating adaptor on said spindle for receiving and retaining said one boring tool for co-rotation with said spindle while permitting slight horizontal and vertical movement within a first tolerance, and wherein
- said one bushing has a second tolerance substantially less than said first tolerance so that said one boring tool is located precisely by said one bushing when said spindle is extended to insert said one boring tool into one bushing and one of said first bores.

36. The work station set forth in claim 21 wherein said work transfer comprises a shuttle carried on said bed for movement along a straight-line horizontal path.

37. The method of boring a first bore in a first workpiece and then a second bore in a second workpiece, said method comprising the steps of:
- moving said first workpiece into a first final machining position in a work station,
- providing a first rotatable spindle with a first boring tool for boring said first bore,
- providing a first bushing stationarily mounted in said work station adjacent said first final machining position while said first workpiece is in said first machining position,
- extending and retracting said spindle to move said first boring tool through said first bore while supporting said first boring tool in said first bushing during a first boring operation, and
- then, after completing said first boring operation, moving said workpiece out of said work station, and
- then moving said second workpiece into a second final machining position in a work station,
- providing a second boring tool for boring said second bore,
- providing a second bushing stationarily mounted in said work station adjacent said second final machining position while said second workpiece is in said second machining position,
- extending and retracting said spindle to move said second boring tool through said second bore while supporting said second boring tool in said second bushing during a second boring operation.

38. Apparatus for back boring a bore in a workpiece, the bore having a radius, the apparatus comprising:
- a bed;
- a work holder shuttle carried on said bed for movement along a straight-line path and configured to receive and retain a workpiece including a bore having a longitudinal bore axis extending in a first direction transverse to said path;
- a first rotatable spindle supported adjacent one side of the path and configured to receive a boring bar having a radially-projecting cutting tool and to support the boring bar for rotation about and reciprocal motion along a spindle axis disposed transverse to said path, the boring bar having a radius at the cutting tool that is greater than the radius of the bore;
- one of said shuttle and said spindle supported for movement in a direction perpendicular to both the path and said spindle axis;
- a drive operatively connected to at least one of said shuttle and said spindle and configured to dispose said shuttle and spindle in an offset position relative to one another in which said spindle axis is parallel to and spaced from said bore axis;
- said drive configured to advance the boring bar along said spindle axis when said shuttle and spindle are in the offset position and to rotationally orient the boring bar such that the cutting tool extends from the boring bar in the general direction that the bore axis is spaced from the spindle axis to accommodate the cutting tool as the boring bar is advanced through the bore;
- said drive configured to dispose said shuttle and spindle in a final machining position relative to one another after the cutting tool has passed through the bore, said spindle axis being coaxially aligned with the bore axis in said final machining position; and
- said drive additionally configured to concurrently rotate and withdraw the boring bar along the bore axis only when said shuttle and spindle are in said final machining position to back bore said bore.

39. The method of back boring a first bore in a workpiece, the bore having a predetermined radius and a longitudinal bore axis, the method comprising the steps of
- providing a rotatable spindle having a longitudinal spindle axis,
- providing a boring bar in the spindle, the boring bar having a radially-projecting cutting tool with the radius of the boring bar at the cutting tool being greater than the bore radius,
- moving the workpiece along a path transverse to the spindle axis to an offset position in which the bore axis is spaced from the spindle axis when the boring bar is in a final machining position, moving the spindle adjacent one side of the path both parallel to the path and in a direction perpendicular to both the path and the spindle axis to precisely locate the boring bar in its final machining position,
- angularly orienting the cutting tool in a direction that the bore axis is offset from the spindle axis when the workpiece is in its offset position so that the cutting tool will clear the bore when the workpiece is in its offset position and the spindle in its final machining position,
- advancing the spindle along the spindle axis to pass the cutting tool of the boring bar through the bore while the workpiece is in the offset position, and
- jogging the workpiece from the offset position to the final machining position to coaxially align the bore with the spindle,
- rotating the boring bar, and
- retracting the spindle along the bore axis to back bore the bore.

* * * * *

UNITED STATES PATENT AND TRADEMARK OFFICE
CERTIFICATE OF CORRECTION

PATENT NO. : 6,013,016
DATED : January 11, 2000
INVENTOR(S) : Edward J. Irvine and Michael D. Panetta It is certified that error appears in the above-indentified patent and that said Letters Patent is hereby corrected as shown below:

Col 13, Line 54, delete "jog" and insert -- jogging --.

Col 14, Line 65, after "axes" (second occurrence) insert -- to --.

Col 15, Line 24, after "and" (second occurrence) insert -- on --.

Col 17, Line 35, after "locate" delete the hyphen (-).

Signed and Sealed this

Third Day of April, 2001

Attest:

NICHOLAS P. GODICI

Attesting Officer    Acting Director of the United States Patent and Trademark Office